(12) United States Patent
Graham (10) Patent No.: US 7,884,814 B1
(45) Date of Patent: Feb. 8, 2011

(54) LIGHT EMITTING DISPLAY MIRRORED CONCEALMENT APPARATUS AND METHOD

(76) Inventor: Jonathan W. Graham, 1020 SE. 11th St., Fort Lauderdale, FL (US) 33316

( * ) Notice: Subject to any disclaimer, the term of this patent is extended or adjusted under 35 U.S.C. 154(b) by 1036 days.

(21) Appl. No.: 11/652,848

(22) Filed: Jan. 12, 2007

(51) Int. Cl.
G06F 3/038 (2006.01)

(52) U.S. Cl. .................. 345/204; 345/905; 349/114; 361/724

(58) Field of Classification Search ........... 345/156, 345/204, 905; 348/789, 794, 795; 349/57, 349/58, 114, 62, 66, 67; 361/681, 694, 695, 361/707, 710, 712, 724; 40/700, 798
See application file for complete search history.

(56) References Cited

U.S. PATENT DOCUMENTS

| | | | |
|---|---|---|---|
| 4,922,384 A | 5/1990 | Torrence | |
| 5,040,102 A | 8/1991 | Bengert | |
| 5,184,158 A * | 2/1993 | Grosser | 352/226 |
| 5,251,392 A | 10/1993 | McManigal | |
| 6,011,650 A * | 1/2000 | Parker et al. | 359/567 |
| 6,144,492 A | 11/2000 | Iwamura et al. | |
| 6,430,858 B1 * | 8/2002 | Andre | 40/714 |
| 6,732,917 B1 * | 5/2004 | Benz et al. | 235/379 |
| 6,901,987 B1 | 6/2005 | Graham | |
| 7,224,468 B2 * | 5/2007 | Fouquet | 356/497 |
| 7,312,836 B2 * | 12/2007 | Maxson | 348/825 |
| 2006/0209502 A1 * | 9/2006 | Sakata et al. | 361/681 |
| 2007/0147022 A1 * | 6/2007 | Lee et al. | 362/97 |
| 2008/0049400 A1 * | 2/2008 | Pecorino et al. | 361/724 |

* cited by examiner

Primary Examiner—Kimnhung Nguyen
(74) Attorney, Agent, or Firm—Dan Brown Law Office; Daniel R. Brown (57) ABSTRACT

An apparatus and method for concealing and revealing a light emitting display. The apparatus includes a housing structure, for positioning about the display, which has an opening aligned for visual access to the display. A film is disposed within the opening, which has the optical properties of partial reflectance and partial transmittance. A shade is supported by the housing structure, and includes a means for moving the shade between a concealed position that disables visual access to the display and a revealed position that enables visual access to the display.

28 Claims, 8 Drawing Sheets

LIGHT EMITTING DISPLAY MIRRORED CONCEALMENT APPARATUS AND METHOD

BACKGROUND OF THE INVENTION

1. Field of the Invention

The present invention relates to light emitting display concealment. More specifically, the present invention relates to a decorative apparatus and method for concealing flat panel video displays, which employ one-way mirrors and internal blackout shades.

2. Description of the Related Art

Flat panel televisions and displays have become common, and will eventually replace virtually all cathode ray tube televisions and displays. Flat panel televisions and displays are frequently hung on a wall, in a fashion reminiscent of paintings and photographs. During the time when a television or display is turned on and active, this techniques works quite satisfactory because the flat panel display is viewed in a manner similar to viewing a painting or photograph. However, when the television or display is not active, the appearance of the blank screen is not aesthetically pleasing. The blank display screen renders an unaesthetic element in an environment that may otherwise be aesthetically decorated. This undesirable aspect of flat panel televisions and displays increases in proportion to the size of the viewable area of the display. Essentially, the larger the viewable area, the larger the blank space it presents in its environment when not active.

Some individuals invest a significant amount of effort and money in decorating their homes in a particular style, including furniture, artwork, wall coverings, fixtures, and so forth. Similarly, businesses and retail stores invest in a particular décor that meets the needs or desires of their owners and customers. The presence of a large flat panel television or display is desirable while such a device is active, however, when not active, the large blank screen can interfere with an intended décor. It may then be desirable to disguise or conceal the television or display in some manner. However, concealment can be problematic in that it can interfere with access to the television or display when needed, and, concealment can interfere with the proper ventilation and cooling during operation of the device. It can also be cumbersome to reveal and conceal such items from time to time, as it is needed for viewing.

There are certain concealment coverings known in the art. It is known in the art to retract or hide the objectionable item when not in use. An example of this approach is a television screen that retracts into an item of furniture or fixture, and is only extended into view when the user desires view the screen. A retractable cover approach has been applied to concealment as well. U.S. Pat. No. 6,901,987 for Furled Decorative Covering Apparatus and Method issued on Jun. 7, 2005, which was invented by Jonathan W. Graham, who is the same inventor of the present invention, and which is hereby incorporated by reference, teaches a decorative covering apparatus and method. Graham teaches an apparatus that covers a flat panel display with furled drape that has a decorative image imprinted thereon, which is extended to cover a television or display when not in use, and that is retracted to reveal it when desired.

Another approach to decorative concealment of a flat panel display is taught in U.S. patent application Ser. No. 11/082,609 for Mirrored Decorative Video Display Concealment and Cooling Apparatus and Method filed on Mar. 25, 2005, which was invented by Jonathan W. Graham, the inventor of the present invention, the content of which is hereby incorporated by reference. The Graham mirrored apparatus and method employ a beam-splitter that has partial transmission and partial reflectance characteristics, which conceals the flat panel display when it is not on operation, resulting in the appearance of a mirror when the display is not on. Alternatively, a half-silvered mirror could be employed in place of the beam splitter. When the display is in operation, its light emissions are transmitted through the beam-splitter, enabling viewing of the display. However, the reflectance and transmittance characteristics of the beam splitter require control of the room lighting and management of the reflecting surfaces of the objects within the display covering apparatus. In both viewing and concealed mode, it is preferred that the room lighting be kept relatively low to improve the visual performance of the apparatus. Further, the flat panel display, interior surfaces, and control elements within the apparatus must be carefully masked to minimize surface reflections that can sometimes be visually detected from the exterior or the apparatus, detracting from the mirror function of the system. Thus, it can be appreciated that there is a need in the art for an apparatus and method for concealing a flat panel display using a beam splitter or half silvered mirror that reduces the problems in the art related to room lighting control and prevention of reflections from internal components intended to be concealed by the mirror when the display is not in operation.

SUMMARY OF THE INVENTION

The need in the art is addressed by the apparatus and methods of the present invention. An apparatus for concealing and revealing a light emitting display is taught. The apparatus includes a housing structure, for positioning about the display, that has an opening aligned for visual access to the display. A film is disposed within the opening, which has the optical properties of partial reflectance and partial transmittance. A shade is supported by the housing structure, and includes a means for moving the shade between a concealed position that disables visual access to the display and a revealed position that enables visual access to the display.

In a specific embodiment of the foregoing apparatus, wherein the light emitting display is a wall mounted flat panel television, the housing structure further includes a means for mounting the housing structure to a vertical surface. In another embodiment, the apparatus further includes a decorative frame disposed about the opening. In a refinement to this embodiment, the decorative frame supports the film within the opening. The decorative frame may be removably attached to the housing structure. In another specific embodiment of the apparatus, the housing structure has a light tight ventilation opening formed therein. In a refinement to the apparatus, a fan is disposed to circulate air between the interior and exterior of the housing structure.

In a specific embodiment of the foregoing apparatus, the film is a beam-splitter filter. In a refinement, the beam-splitter filter is multiple layer dielectric material applied to a substrate. The multiple layer dielectric material may be comprised of a titanium-dioxide layer and a magnesium-fluoride layer. In a particular embodiment, the beam-splitter film provides transmission in the range of approximately 45% to 70% across the visible spectrum. In another refinement, the film is supported on a glass substrate disposed within the opening. In another specific embodiment of the foregoing apparatus, the shade is black. In another embodiment, the shade is a flexible sheet of opaque material.

In a specific embodiment for the foregoing apparatus, the means for moving further includes a roller disposed within the housing structure and the shade is attached to the roller. In operation, rotation of the roller in a first direction unfurls the shade to the concealed position and rotation of the roller in a second direction furls the shade to the revealed position. In another specific embodiment of the foregoing apparatus, the means for moving includes a motor. In another specific embodiment, a guide channel is disposed within the housing structure, which operates to guide the movement of the shade.

In a specific embodiment of the foregoing apparatus, the means for moving further includes a roller disposed within the housing structure and coupled to a motor. The shade is attached to the roller, and the motor operates to drive the roller in a first direction, thereby unfurling the shade to the concealed position and operates to drive the roller in a second direction, thereby furling the shade to the revealed position. In a refinement to this embodiment, the apparatus also includes a remote control receiver that receives a control signal, and that is coupled to control the motor to rotate in the first direction and the second direction in response to receipt of the control signal.

The present invention also teaches an apparatus for concealing and revealing a wall mounted flat panel television. This apparatus includes a housing structure, for positioning about the television, that has a light tight ventilation opening formed therein, and a fan disposed to circulate air between the interior and exterior of the housing structure for cooling the television. There is also a means for mounting the housing structure to the wall. A decorative frame is removably coupled to the housing structure and has an opening aligned for visual access to the television. A dielectric beam splitter filter is disposed upon a glass substrate, which is supported within the opening. The filter has the optical properties of partial reflectance and partial transmittance. A flexible, opaque, black shade is supported by a roller within the housing structure. A motor is coupled to rotate the roller in a first direction, thereby unfurling the shade to the concealed position that disables visual access to the television, and to rotate the roller in a second direction, thereby furling the shade to the revealed position that enables visual access to the television. A guide channel is disposed within the housing structure that guides the movement of the shade. A remote control receiver receives a control signal, and controls the motor to rotate in the first direction and the second direction in response to receipt of the control signal.

The present invention teaches a method of concealing and revealing a light emitting display. The method includes the steps of positioning a housing structure, which includes a opening, about the display so as to align the opening for visual access to the display, and disposing a film within the opening, the film having the optical properties of partial reflectance and partial transmittance. Also, moving the shade between a concealed position that disables visual access to the display and a revealed position that enables visual access to the display.

In a specific embodiment of the foregoing method, wherein the light emitting display is a wall mounted flat panel television, the method includes the further step of mounting the housing structure to the wall about the television. In another embodiment, the method includes the step of mounting a decorative frame about the opening. It may also include the step of supporting the film within the opening in the decorative frame. In another embodiment, the method includes circulating air between the interior and exterior of the housing structure. In another embodiment, the method includes supporting the film on a glass substrate disposed within the opening.

In a specific embodiment of the foregoing method, the moving step further includes rotating a roller attached to the shade in a first direction, thereby unfurling the shade to the concealed position, and rotating the roller in a second direction, thereby furling the shade to the revealed position. In another embodiment, the method further includes guiding the movement of the shade. The moving step may be accomplished using a motor. The step of remotely controlling the motor may be added.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods and components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, and the like may be used solely to distinguish one entity or action from another entity or action without necessarily requiring or implying any actual such, relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teaching herein address the problems in the art through illustrative embodiments that provide a decorative solution to concealing and revealing light emitting displays, including LCD, LED, and plasma flat panel televisions and display terminals. Although it will be appreciated by those skilled in the art that the teachings herein can also be adapted to cathode ray tube televisions and displays, as well as all other light emitting apparatus that are intended for, or are useful for, viewing by a user. The term "video display" will be used herein for the sake of brevity, but its use is not intended as a limitation on the scope of the present invention. Some embodiments employ a second generation beam splitter mirror, sometimes referred to as a "one-way" mirror. The beam splitter provides higher reflectivity, truer color fidelity, and operates well in higher ambient light environments that prior art designs. A special blackout material is used as a shade between the light emitting display and the beam splitter mirror. When the user desires to view the light emitting display, the shade is retracted using a motorized roller. When retracted to a revealing position, the light emitted from the display passes through the beam splitter and can be viewed by the user. When the viewing is complete, the shade is extended by the roller, thereby concealing the light emitting display and all other internal components behind the black shade. This arrangement prevents ambient light from entering the interior of the apparatus, reflecting off internal surfaces, and then passing back through the beam splitter. The net effect is to create a more mirror-like appearance from the exterior of the beam splitter, and the reduction in the need to carefully mask all of the internal components of the apparatus to avoid internal reflections.

In an illustrative embodiment, a Lutron, Inc. Sivoia QED Series motorized shade roller is employed to operate the shade. When the light emitting display is energized, an image is presented on the display, but is hidden by the motorized shade. At the same time, the shade begins to be retracted onto the roller, thereby revealing the display in the mirror in a graceful fashion that is visually pleasing to the viewer, because the images seems to appear in the mirror in a magical fashion. The second generation beam splitter has an improved dielectric coating with flatter spectral characteristic and an 8% increased reflectivity, representing a 25% increase in perceived brightness, as compared to the first generation beam splitter used in the Media Décor Media Mirror™ product line (www.mediadecor.com). The net reflectivity approaches 60%, comparing favorable to a conventional silvered mirror reflectivity of about 80%. The beam splitter film coating is custom applied by Flabeg, Corp. USA located in Allegheny, Pa. (www.flabeg.com).

Figure 1:
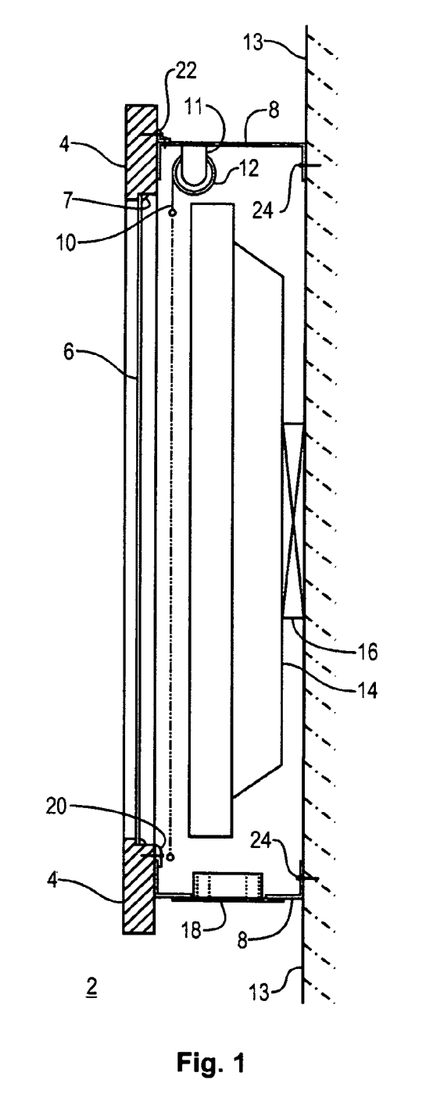
FIG. 1 is a section view drawing of a video display mirrored concealment apparatus according to an illustrative embodiment of the present invention.

Reference is directed to FIG. 1, which is a section view drawing of a video display mirrored concealment apparatus 2 according to an illustrative embodiment of the present invention. This embodiment is appropriate in the case of a video display 14 that is supported from a vertical wall surface 16 using a video display mount 16, as are known to those skilled in the art. The apparatus includes a housing structure 8 that is attached to the wall 13 using suitable fastening means 24. Those skilled in the art will appreciate that any convention fastener, such as screws, nails, hooks, clips, brackets, and other fastening means known to those skilled in the art could be used as a fastening means to support the housing structure 8 to the wall 13. The housing structure 8 has a front opening and forms a perimeter around the sides of the video display 14, thereby concealing the edges from view. A decorative frame 4 is attached to the front of the housing structure 8 using a lip fastener 20 that engages an edge of the housing structure 8, and a clip 22 that attached to the top of the housing structure 8 using a suitable fastener, such as a pin and hole combination. The decorative frame also has an opening formed in a manner similar to a picture frame, and the opening is aligned to enable viewing of the video display 14 there through. A beam splitter film is disposed on a glass substrate 6, which is supported within the opening in the decorative frame using a suitable glazing fastener 7. In the illustrative embodiment, the film is applied to the interior surface of the glass 6 so as to protect it during routine cleaning of the exterior surface by a user. The video display 14 produces heat during operation, which may become problematic if not managed. Light tight baffles (not shown) enable the flow of ambient air between the interior and exterior of the housing structure 8. A fan 18 is used to induce airflow and enhance the cooling effect of circulate ambient air.

As noted herein before, a problem in the art is the potential for reflection of light entering through the beam splitter 6, reflecting off of the video display 14 and other internal components within the apparatus, and then being retransmitted out through the beam splitter 6. The present invention prevents this action by employing a shade 10, which is lowered between the video display 14 and the beam splitter 6 using a motorized roller 12. In FIG. 1, the shade is shown in the retracted position, where the video display is revealed, with a phantom line showing its extended, or concealed position. The motorized roller is supported with a pair of support brackets 11, that fix the roller 12 to the housing structure 8. Along the sides of the path that the shade 10 traverses are a pair of guide channels (not shown), which prevent the shade 10 from contacting either the video display 14 or the beam splitter 6. The shade in the illustrative embodiment is a flexible sheet of black synthetic material with a built in weighted "bat" on the leading edge that adds weight to keep the shade material flat.

Figure 2:
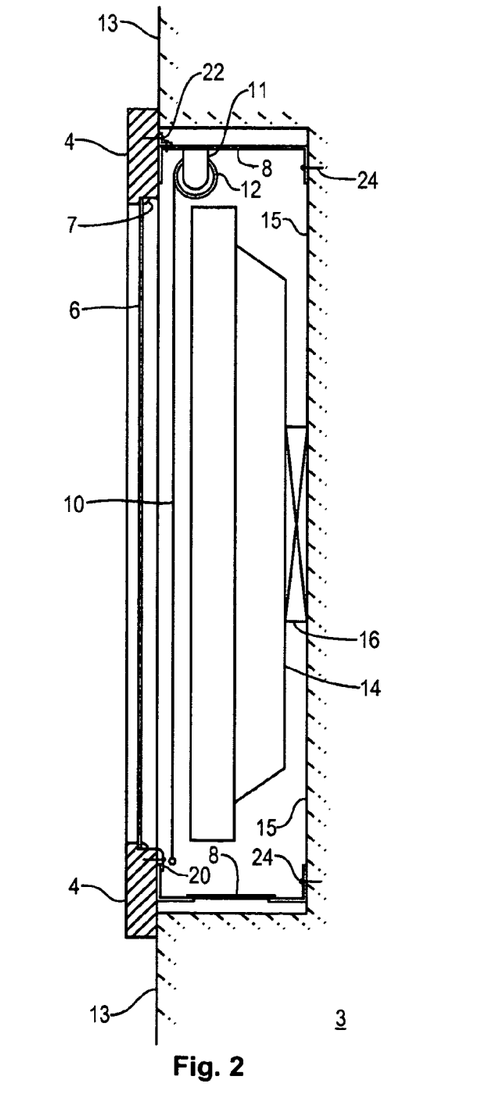
FIG. 2 is a section view drawing of a video display mirrored concealment apparatus according to an illustrative embodiment of the present invention.

Reference is directed to FIG. 2, which is a section view drawing of a video display mirrored concealment apparatus 3 according to an illustrative embodiment of the present invention. FIG. 2 illustrates a second implementation of the apparatus of FIG. 1, however the apparatus is configured for a flush-mount installation in FIG. 2. The wall 13 is formed with a recess 15 having a depth equal to the housing structure 8 depth. The video display 14 is supported from the back wall 15 of the recess in the wall 13 using a suitable mount 16. In another embodiment, the housing structure includes a rear wall and the video display is supported therefrom. The decorative frame 4 is supported from the housing structure 8 using the same lip 20 and clip 22 fasteners such that the back surface of the decorative frame is essentially flush with the wall surface 13. The beam splitter 6, shade 10, and related mechanism all operate the same as described respecting FIG. 1. In FIG. 2, the shade is shown in the extended, or concealed, position. When viewed from the front, the decorative frame 4 and beam splitter 6 give the distinct impression that they are simply a wall-mounted mirror. The blackened shade 10 enhances this effect and gives the mirror better reflectivity characteristics because there are no secondary reflections or transmissions, which would otherwise reduce the contrast of the primary reflections on the front of the "mirror." When the video display is turned on, the shade 10 is retracted, and the image on the video display appears through the beam splitter 6. The brightness of the video display overwhelms the primary reflections from the front of the mirror, and this effect can be enhanced further by keeping ambient light at reasonable levels.

Figure 3:
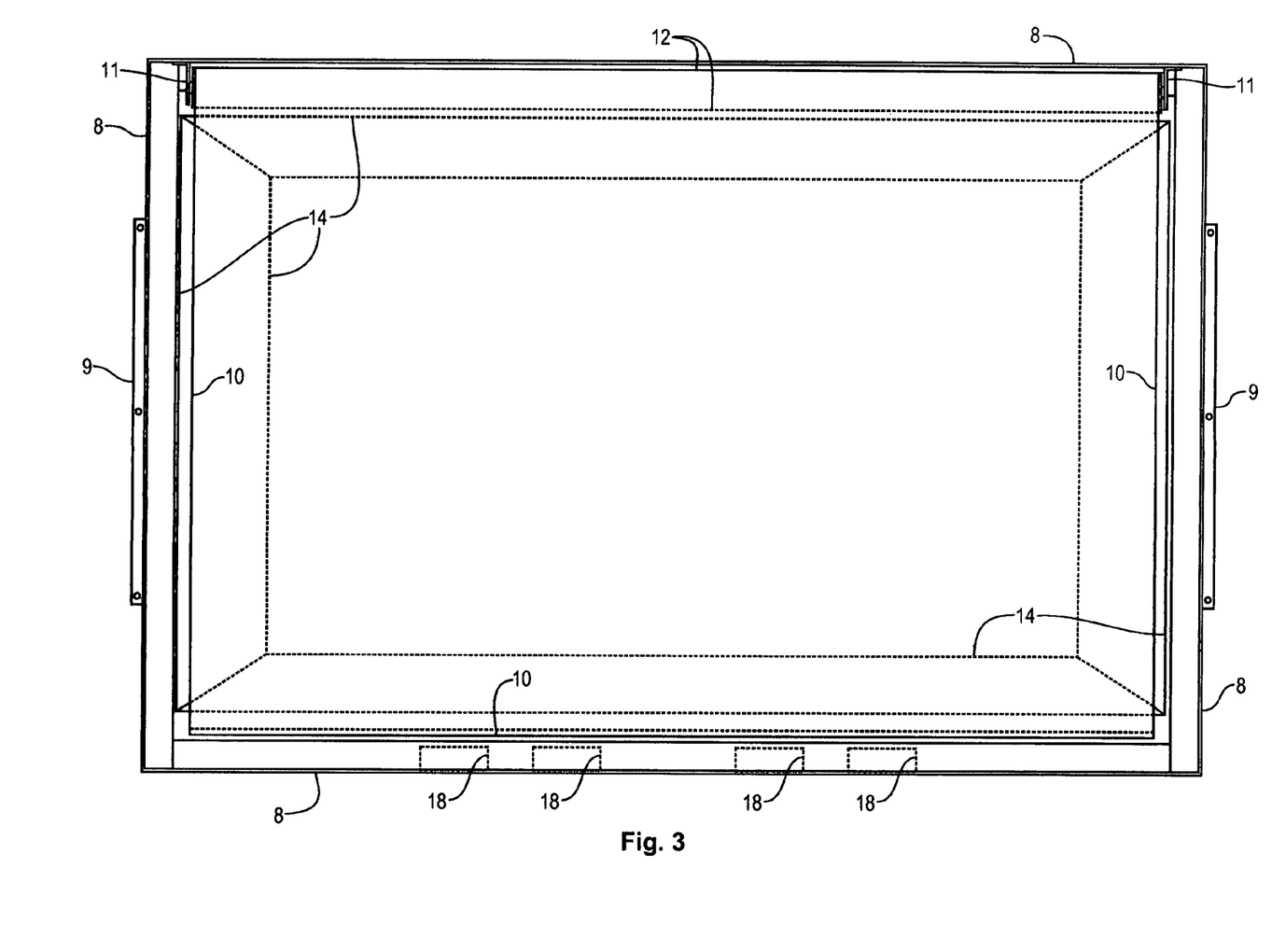
FIG. 3 is a front view drawing of the frame and shade mechanism in a video display mirrored concealment apparatus according to an illustrative embodiment of the present invention.

Reference is directed to FIG. 3, which is a front view drawing of the housing structure 8 and shade mechanism in a video display mirrored concealment apparatus according to an illustrative embodiment of the present invention. The housing structure 8 forms a perimeter around the video display 14 that is concealed behind the shade 10, which is illustrated in the concealed position in FIG. 3. The shade 10 is furled and unfurled from a motorized roller 12, which is supported from the housing structure 8 using a pair of mounting brackets 11. The housing structure 8 and brackets 11 are fabricated from a suitable metal in the illustrative embodiment. A pair of mounting flanges 9 are presented on either side of the housing structure 8 and can be used as a fastening means for mounting the apparatus to any vertical surface. In the illustrative embodiment, plural cooling fans 18 are installed along the bottom surface of the housing structure 8, and are used to induce the flow of ambient air from the exterior to the interior of the housing structure, thereby cooling the video display 10 during operation. Light tight baffles (not shown) are inserted on the top or sides of the housing structure 8 for enabling exhaust of the cooling air.

Figure 4:
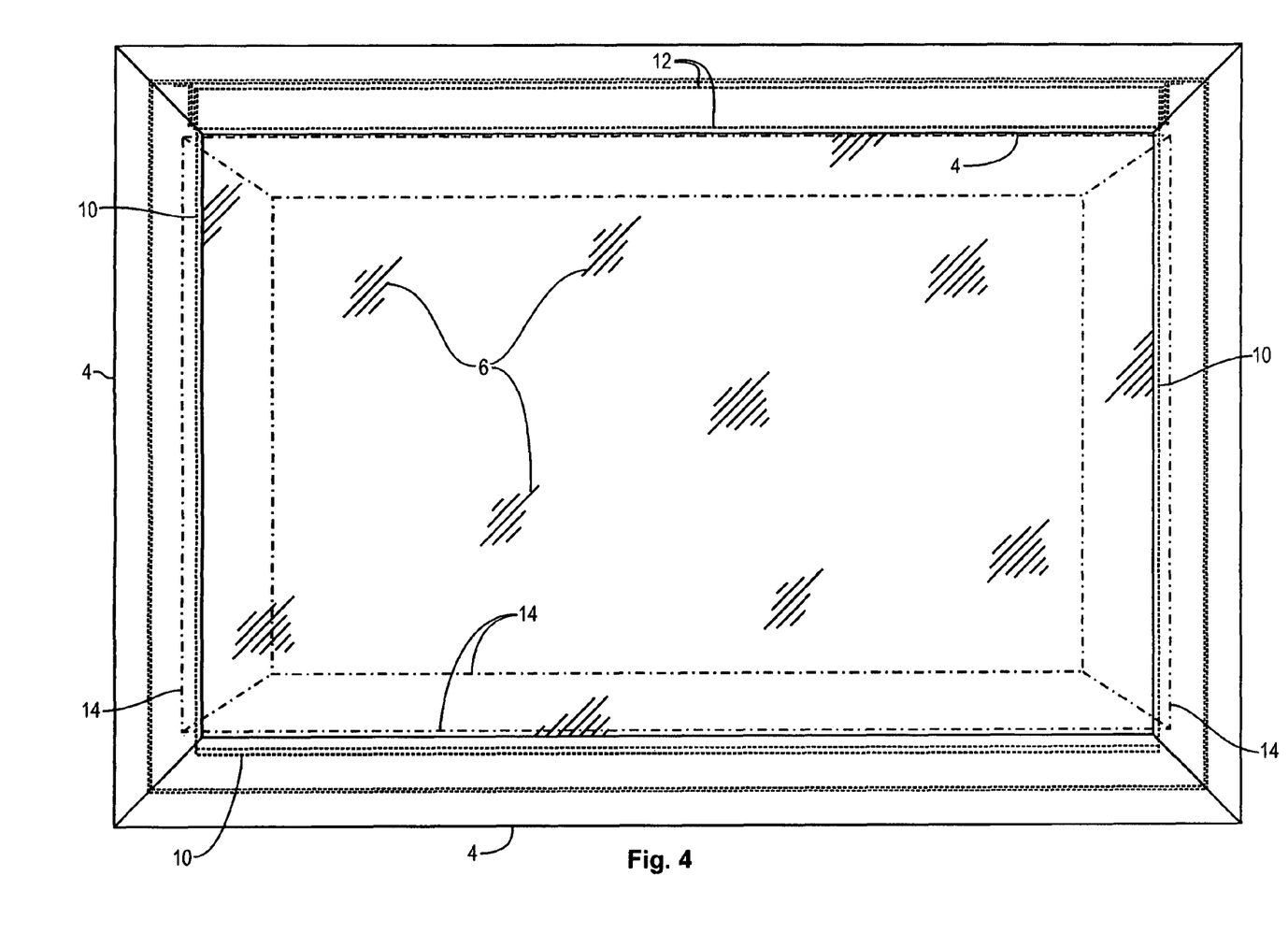
FIG. 4 is a front view drawing of a video display mirrored concealment apparatus according to an illustrative embodiment of the present invention.

Reference is directed to FIG. 4, which is a front view drawing of a video display mirrored concealment apparatus according to an illustrative embodiment of the present invention. FIG. 4 is similar to FIG. 3, however, the decorative frame 4 and beam splitter film and glass substrate 6 are illustrated in position on the front of the apparatus. The relationship between the opening in the decorative frame 4 and the shade 10 can be appreciated in this view. Note that the entire opening is concealed when the shade is unfurled from the motorized roller 12 to the concealed position, as illustrated. The entire viewing area of the video display 14 falls within the area of the beam splitter 6, so as to enable viewing of the entire screen when the shade is raised to the revealed position.

Figure 5:
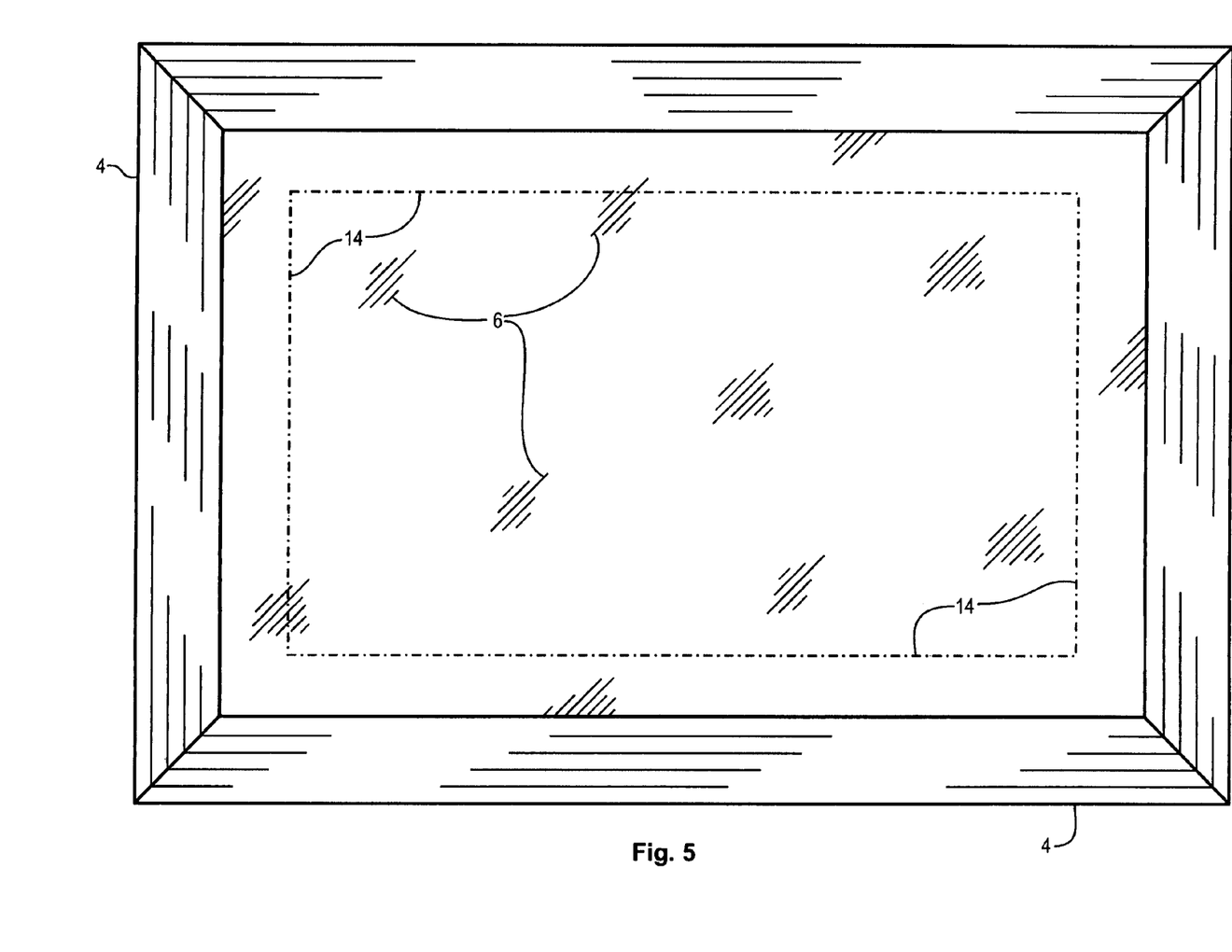
FIG. 5 is a front view drawing of a video display mirrored concealment apparatus according to an illustrative embodiment of the present invention.

Reference is directed to FIG. 5, which is a front view drawing of a video display mirrored concealment apparatus according to an illustrative embodiment of the present invention. This figure illustrates the appearance of the apparatus when in the concealed mode, which appears to me a framed mirror. In particular, the decorative frame 4 is visible together with the beam splitter 6, and that is all. The location of the video display area 14 is shown for reference only. The decorative frame 4 may be selected from any style desired by the user, in the same manner as decorative picture frames are selected. The fact that the frame 4 is removably mounted to the housing structure enhances the ability to pick and choose a style suited to the décor or the user's fancy.

Figure 6:
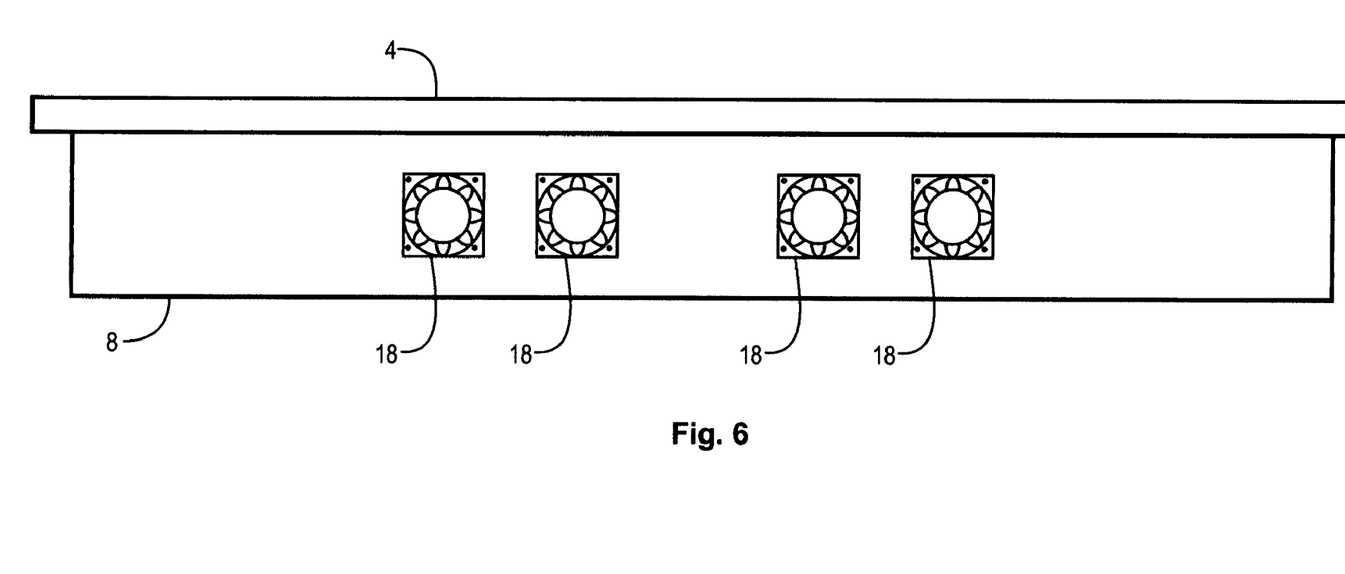
FIG. 6 is a bottom view drawing of a video display mirrored concealment apparatus according to an illustrative embodiment of the present invention.

Reference is directed to FIG. 6, which is a bottom view drawing of a video display mirrored concealment apparatus according to an illustrative embodiment of the present invention. This view illustrates the positioning the plural fans 18 in the bottom of the housing structure. The decorative frame 4 is also visible. Note that the exterior of the metal housing structure is finished in a suitable color to minimize its appearance, and may be covered with a decorative veneer if desired.

Figure 7:
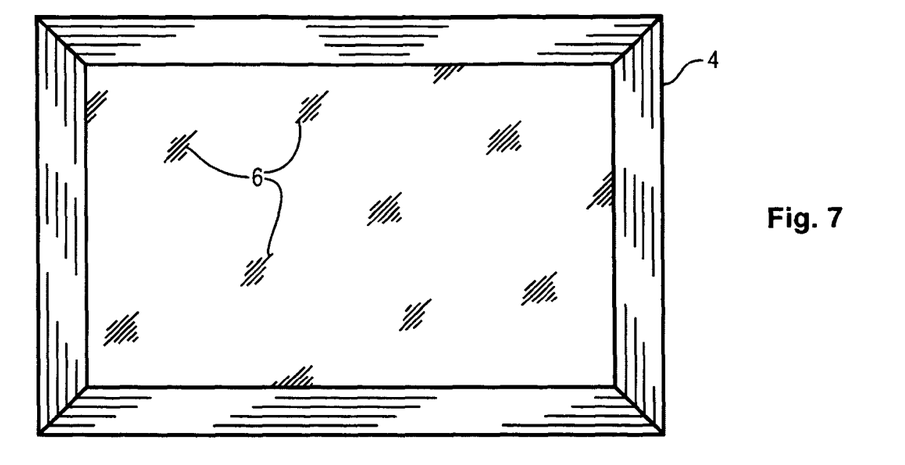
FIG. 7 is a front view drawing of a video display mirrored concealment apparatus according to an illustrative embodiment of the present invention.
Figure 8:
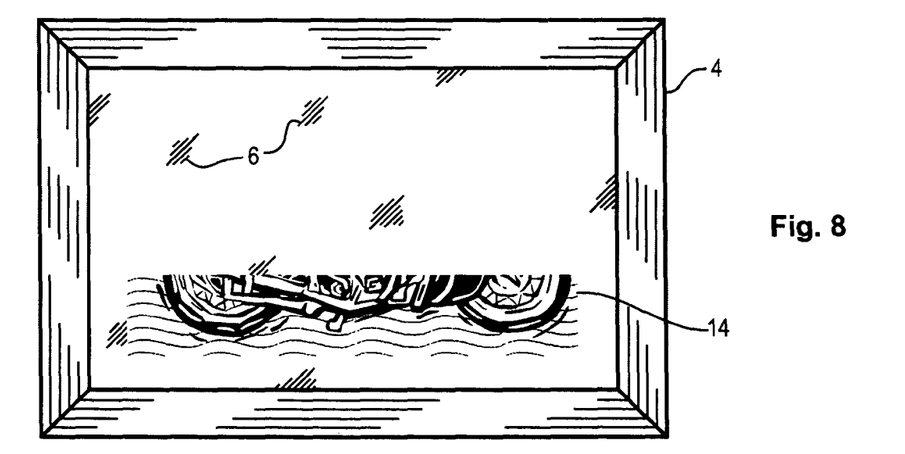
FIG. 8 is a front view drawing of a video display mirrored concealment apparatus according to an illustrative embodiment of the present invention.
Figure 9:
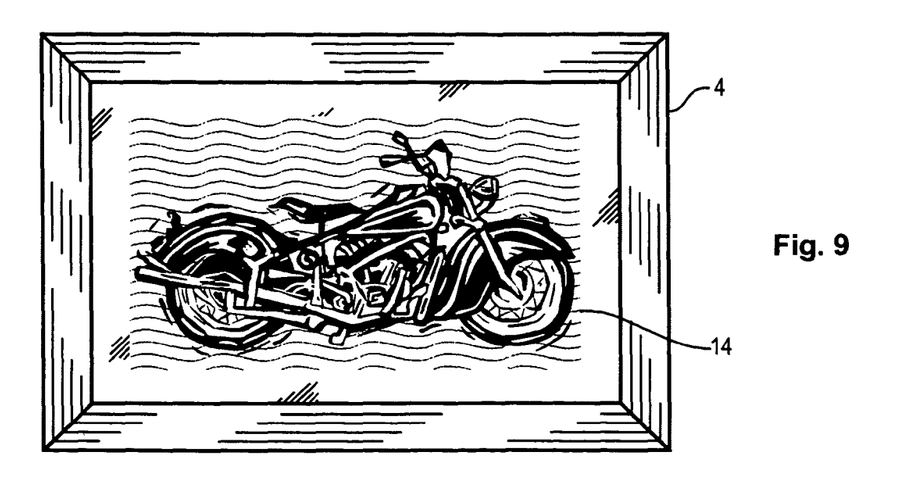
FIG. 9 is a front view drawing of a video display mirrored concealment apparatus according to an illustrative embodiment of the present invention.

Reference is directed to FIG. 7, FIG. 8, and FIG. 9, which are front view drawings of a video display mirrored concealment apparatus according to an illustrative embodiment of the present invention. This sequence of figures illustrates the appearance of the apparatus and method to a view as the video display is turned on and the shade retracts within the housing structure. In FIG. 7, the decorative frame 4 and beam splitter mirror 6 are visible only. All of the internal components and structures are obscured by the beam-splitter 6 in combination with the blackened shade behind (not visible). The combination of the darkened interior of the structure and the reflected ambient light makes the beam splitter 6 have a mirror-like appearance, thereby achieving the desired decorative effect. Note that the video display has already been energized in FIG. 7 and is emitting light, but that light is not visible due to the shade. In FIG. 8, the shade is in motion upward within the viewing area of the video display 14. The light emitted from the display 14 is transmitted through the beam splitter 6 and overwhelms the reflected ambient light, and thus appears as a video image to the user. The graceful appearance of the video image as the shade is retracted to the revealed position provides a pleasing transition. FIG. 9 illustrates the apparatus with the shade in the fully revealed position, such that the display image 14 is situated within the decorative frame 4, for normal viewing of the images on the light emitting display 14.

Figure 10:
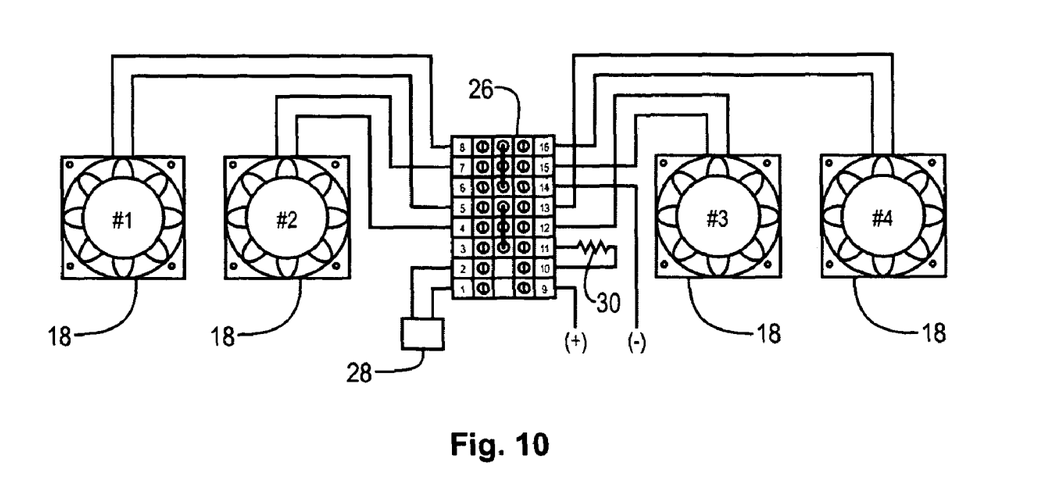
FIG. 10 is a fan wiring diagram in a mirrored decorative video display concealment apparatus according to an illustrative embodiment of the present invention.

Reference is directed to FIG. 10, which is a fan wiring diagram in a mirrored decorative light emitting display concealment apparatus according to an illustrative embodiment of the present invention. A terminal block 26 is used to interconnect the four fans 18, labeled Fan #1, Fan #2, Fan #3, and Fan #4, the power supply, a resistor 30, and a thermally activated switch 28. Every terminal in each horizontal row of the terminal block 26 is electrically coupled together. The columns are electrically isolated, but are coupled according to the central column jumpers. Thus, it is apparent that the four fans are wired in parallel, and then in series with the resistor 30, the thermal switch 28, and the power supply. When the ambient temperature in the enclosure exceeds the predetermined threshold of the thermal switch 28, then contacts in the switch 28 close and cause power supply current to flow through the resistor 30 and into the fans. Note that the resistor 30 has the effect of operating the fans at reduced speed, enabling very quiet operation of the system. The thermal switch 28 used in the illustrative embodiment may be of any suitable type as are known to those skilled in the art. The power supply (not shown) is of a type suitable for the current and voltage requirements of the fans selected. The thermal switch 28 is preferable located near the top of the housing structure, such as adjacent to the wiring terminal block 26. In the illustrative embodiment, twelve volt direct current fans are used, and the power supply is a wall plug transformer type, as are known to those skilled in the art.

Figure 11:
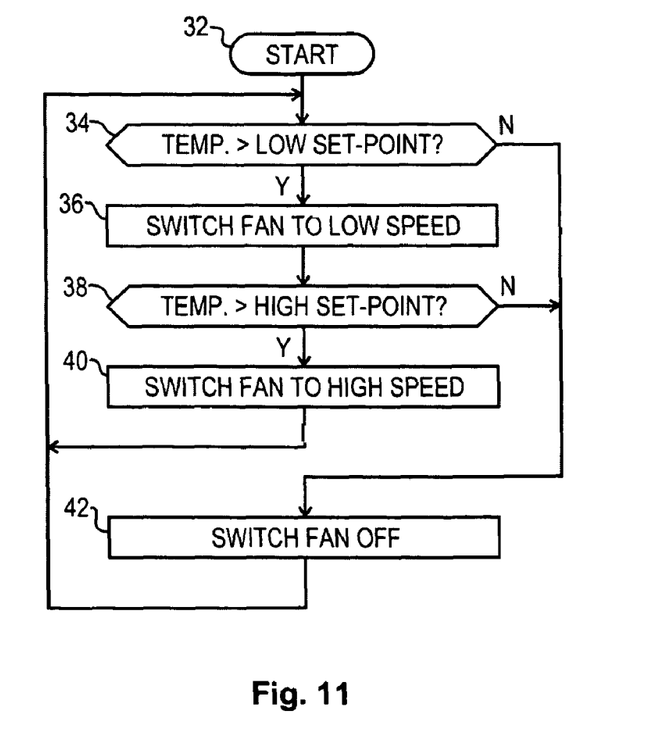
FIG. 11 is a cooling process flow diagram in a mirrored decorative video display concealment apparatus according to an illustrative embodiment of the present invention.

Reference is directed to FIG. 11, which is a cooling process flow diagram in a mirrored decorative light emitting display concealment apparatus according to an illustrative embodiment of the present invention. In another illustrative embodiment of the present invention, a two-speed fan arrangement is contemplated. In this instance, the fans are either operated at reduced speed with reduced cooling capacity, or at full speed with full cooling capacity. FIG. 11 is a cooling process flow diagram illustrating this embodiment. The process begins at step 32 and proceeds to step 34 where a test is made to determine if the low temperature set point has been reached. If not, the fans are switched off at step 42. On the other had, at step 34, is the low temperature set point has been reached, then the fans are energized to the low fan speed at step 36 and flow proceeds to step 38. At step 38, a test is made to determine if the high temperature set point has been reached. If not, the fans are switched off at step 42. On the other hand, at step 38, is the high temperature set point has been reached, then the fans are energized to the high fan speed at step 40 and flow returns to step 34 to repeat the temperature testing sequence again and again over time. The same return sequence applies at step 42 where the fans were shut off. With this arrangement, the system continually monitors the enclosure temperature and adjusts the fan speed according to need.

Figure 12:
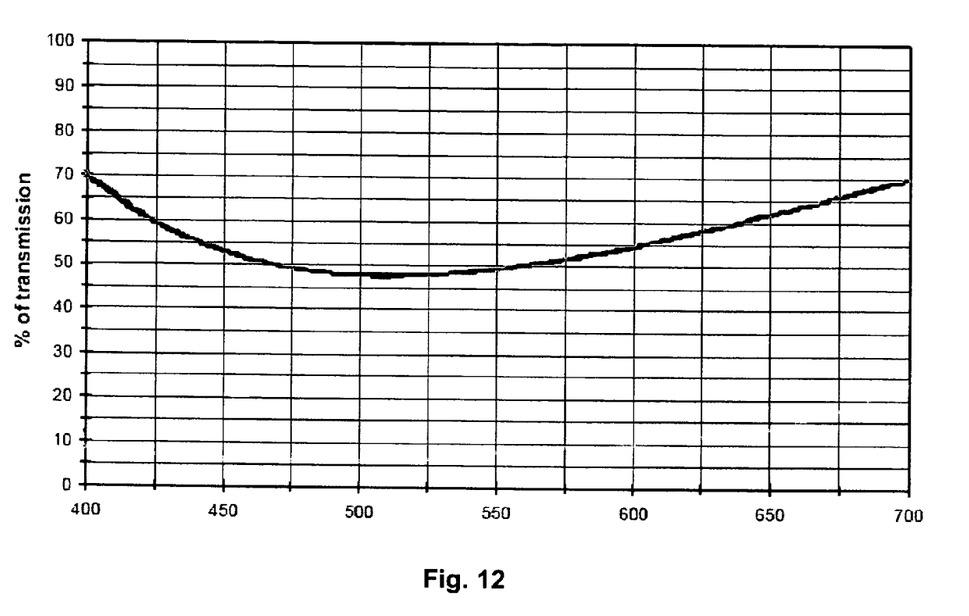
FIG. 12 is a spectral transmission diagram of the beam splitter in a mirrored decorative video display concealment apparatus according to an illustrative embodiment of the present invention.

Reference is directed to FIG. 12, which is a spectral transmission diagram of the beam splitter in a mirrored decorative light emitting display concealment apparatus according to an illustrative embodiment of the present invention. The beam split film utilized in an illustrative embodiment is a multi-layer vapor deposited dielectric coating applied to annealed glass, which forms a substrate for the beam-splitter film. When assembled, the film is located toward the interior of the enclosure, so that routine cleaning of the surface by the user does not damage the dielectric layers. In the illustrative embodiment, the three dielectric layers are comprised of titanium-dioxide, magnesium-fluoride, and titanium-dioxide, with a total thickness of about 2000 angstroms. Those skilled in the art will appreciate that other substrate and coating layers may be used to achieve the desire reflectivity and transmission characteristics. It should be noted that the traditional half-silvered one-way mirror can be used, but will render a dimmer image of the video display, with a lower level of reflectivity when concealing the dark video display. The preferred spectral transmission characteristics are illustrated in FIG. 12. The curve is balanced across the visible spectrum to yield a near neutral color cast to the transmitted image. Minimum transmission of at least 45% occurs in the mid-band at about 500 angstroms. The edges of the spectral band rise in transmission to about 70%, which yields a bright image for viewing by a user.

When the video display is turned on, light is emitted from the display screen in the form of a video image. This image is transmitted through the beam-split film, which has visible light transmission in the aforementioned range of 45% to 70%. The bright video display image easily dominates the reflected ambient light, and the video image is readily viewable by users. In typical use, users will frequently reduce the ambient light levels in the local environment, which enhance further the viewing experience of the video display. In an illustrative embodiment, the beam-split film is "tuned" to provide high transmission of the near infrared band, typically about 80%. This has two important benefits. First, it allows an infrared remote control for the video display to function reliably through the beam-split film. Second, it allows radiated heat from the video display to escape through the front opening. Heat production by the video display and its removal through conduction and convection are also addressed by the present invention, which will be fully discussed hereinafter.

Figure 13:
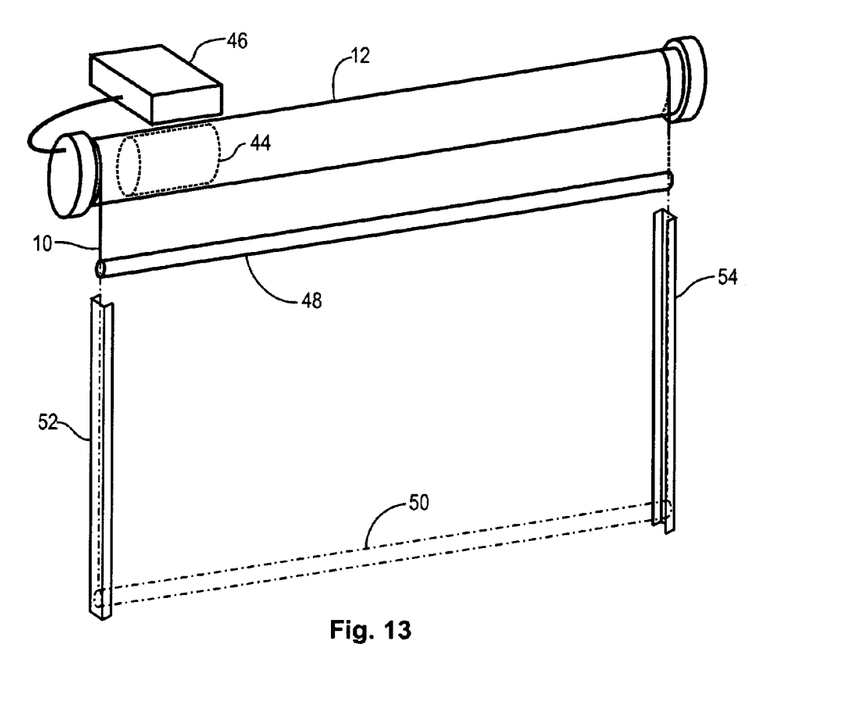
FIG. 13 is a perspective drawing of the shade mechanism in a mirrored decorative video display concealment apparatus according to an illustrative embodiment of the present invention.

Reference is directed to FIG. 13, which is a perspective drawing of the shade mechanism in a mirrored decorative light emitting display concealment apparatus according to an illustrative embodiment of the present invention. The motorized roller 12 of the illustrative embodiment is a Lutron Sivoia QED series "64" or series "100" shade roller, which is available from Lutron, Inc., 7200 Suter Road, Coopersburg, Pa. 18036 (www.lutron.com). The QED roller 12 includes an internal drive motor 44, which is powered and controlled through a radio remote control unit 46 in the illustrative embodiment. The blackened synthetic shade 10 includes a weighted "bat" rod 48, which holds the shade taught when extended to the concealed position 50. A pair of guide channels 52, 54 guide the movement of the shade 10 and prevent it from contacting either the beam splitter or the video display during operation.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for concealing and revealing a light emitting display, comprising:
    a housing structure, for positioning about the display, having an opening aligned for visual access to the display;
    a film disposed within said opening, said film having the optical properties of partial reflectance and partial transmittance;
    a shade, which is a flexible sheet of opaque material, supported by said housing structure;
    a means for moving said shade between a concealed position that disables visual access to the display and a revealed position that enables visual access to the display, and wherein said means for moving further comprises;
    a roller disposed within said housing structure, and wherein
    said shade is attached to said roller, and wherein
    rotation of said roller in a first direction unfurls said shade to said concealed position and rotation of said roller in a second direction furls said shade to said revealed position.

2. The apparatus of claim 1 wherein the light emitting display is a wall mounted flat panel television, and wherein said housing structure further comprises:
    a means for mounting said housing structure to a vertical surface.

3. The apparatus of claim 1, further comprising:
    a decorative frame disposed about said opening.

4. The apparatus of claim 3 wherein said decorative frame supports said film within said opening.

5. The apparatus of claim 3 wherein said decorative frame is removably attached to said housing structure.

6. The apparatus of claim 1 wherein said housing structure has a light tight ventilation opening formed therein.

7. The apparatus of claims 1, further comprising:
    a fan disposed to circulate air between the interior and exterior of said housing structure.

8. The apparatus of claim 1 wherein said film is a beam-splitter filter.

9. The apparatus of claim 8 wherein said beam-splitter filter is multiple layer dielectric material applied to a substrate.

10. The apparatus of claim 9 wherein said multiple layer dielectric material is comprised of a titanium-dioxide layer and a magnesium-fluoride layer.

11. The apparatus of claim 8 wherein said beam-splitter film provides transmission in the range of approximately 45% to 70% across the visible spectrum.

12. The apparatus of claim 1 wherein said film is supported on a glass substrate disposed within said opening.

13. The apparatus of claim 1 wherein said shade is black.

14. The apparatus of claim 1, further comprising:
a guide channel disposed within said housing structure operable to guide the movement of said shade.

15. The apparatus of claim 1 wherein said means for moving comprises a motor.

16. The apparatus of claim 15, wherein said means for moving further comprises:
a roller disposed within said housing structure and coupled to said motor, and wherein
said shade is attached to said roller, and wherein
said motor is operable to drive said roller in a first direction, thereby unfurling said shade to said concealed position and operable to drive said roller in a second direction, thereby furling said shade to said revealed position.

17. The apparatus of claim 16, further comprising:
a remote control receiver operable to receive a control signal, and coupled to control said motor to rotate in said first direction and said second direction in response to receipt of said control signal.

18. An apparatus for concealing and revealing a wall mounted flat panel television, comprising:
a housing structure, for positioning about the television, said housing structure having a light tight ventilation opening formed therein, and a fan disposed to circulate air between the interior and exterior of said housing structure;
a means for mounting said housing structure to the wall;
a decorative frame removably coupled to said housing structure and having an opening aligned for visual access to the television;
a dielectric beam splitter filter disposed upon a glass substrate and supported within said opening, said filter having the optical properties of partial reflectance and partial transmittance;
a flexible, opaque, black shade supported by a roller within said housing structure;
a motor coupled to rotate said roller in a first direction, thereby unfurling said shade to said concealed position that disables visual access to the television, and coupled to rotate said roller in a second direction, thereby furling said shade to said revealed position that enables visual access to the television;
a guide channel disposed within said housing structure operable to guide the movement of said shade, and
a remote control receiver operable to receive a control signal, and coupled to control said motor to rotate in said first direction and said second direction in response to receipt of said control signal.

19. A method of concealing and revealing a light emitting display, comprising the steps of:
positioning a housing structure, which includes a opening, about the display thereby aligning the opening for visual access to the display;
disposing a film within the opening, the film having the optical properties of partial reflectance and partial transmittance;
moving said shade between a concealed position that disables visual access to the display and a revealed position that enables visual access to the display, and wherein
said moving step further comprises the steps of rotating a roller attached to the shade in a first direction thereby unfurling the shade to the concealed position, and rotating the roller in a second direction, thereby furling the shade to the revealed position.

20. The method of claim 19 wherein the light emitting display is a wall mounted flat panel television, and further comprising the step of:
mounting the housing structure to the wall about the television.

21. The method of claim 19, further comprising the step of:
mounting a decorative frame about the opening.

22. The method of claim 21, further comprising the step of:
supporting the film within the opening in the decorative frame.

23. The method of claims 19, further comprising the step of:
circulating air between the interior and exterior of the housing structure.

24. The method of claim 19, further comprising the step of:
supporting the film on a glass substrate disposed within the opening.

25. The method of claim 19 wherein the shade is a flexible sheet of opaque material.

26. The method of claim 19, further comprising the step of:
guiding the movement of the shade.

27. The method of claim 19 wherein said moving step is accomplished using a motor.

28. The method of claim 27, further comprising the step of:
remotely controlling the motor.

* * * * *